United States Patent
Yamaguchi

(10) Patent No.: US 7,196,344 B2
(45) Date of Patent: Mar. 27, 2007

(54) SOLID STATE RADIATION DETECTOR AND METHOD FOR TESTING THE SAME

(75) Inventor: Akira Yamaguchi, Ashigarakami-gun (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 11/366,410

(22) Filed: Mar. 3, 2006

(65) Prior Publication Data

US 2006/0214122 A1     Sep. 28, 2006

(30) Foreign Application Priority Data

Mar. 4, 2005  (JP) ............................. 2005-060569

(51) Int. Cl.
*G01N 23/04*  (2006.01)
(52) U.S. Cl. ................................. 250/582; 250/370.09
(58) Field of Classification Search ................ 250/582, 250/370.08, 370.09, 370.14
See application file for complete search history.

(56) References Cited

U.S. PATENT DOCUMENTS

| | | | |
|---|---|---|---|
| 5,017,989 A * | 5/1991 | Street et al. ................ 257/291 |
| 5,895,936 A * | 4/1999 | Lee ............................. 257/59 |
| 6,075,248 A * | 6/2000 | Jeromin et al. ......... 250/370.09 |
| 6,268,614 B1 | 7/2001 | Imai |
| 6,281,507 B1 * | 8/2001 | Ghelmansarai ........ 250/370.09 |
| 6,518,575 B1 | 2/2003 | Imai |
| 6,730,914 B2 * | 5/2004 | Chao et al. ............ 250/370.14 |
| 6,770,901 B1 | 8/2004 | Ogawa et al. |

\* cited by examiner

*Primary Examiner*—Otilia Gabor
(74) *Attorney, Agent, or Firm*—Sughrue Mion, PLLC

(57) ABSTRACT

A solid state radiation detector constituted by a solid state detecting section having multitudes of charge detecting linear electrodes and multitudes of auxiliary linear electrodes; a test signal generating means for generating a test signal; and a connection switching means for connecting at least one end of the auxiliary linear electrodes to either the test signal generating means or ground. The test signal is inputted to the auxiliary linear electrodes and crosstalk signals outputted based on the test signal from the charge detecting linear electrodes adjacent to the auxiliary linear electrodes to which the test signal has been inputted are detected and compared with a predetermined reference signal in order to check the charge detecting linear electrodes and auxiliary linear electrodes for breakage.

2 Claims, 2 Drawing Sheets

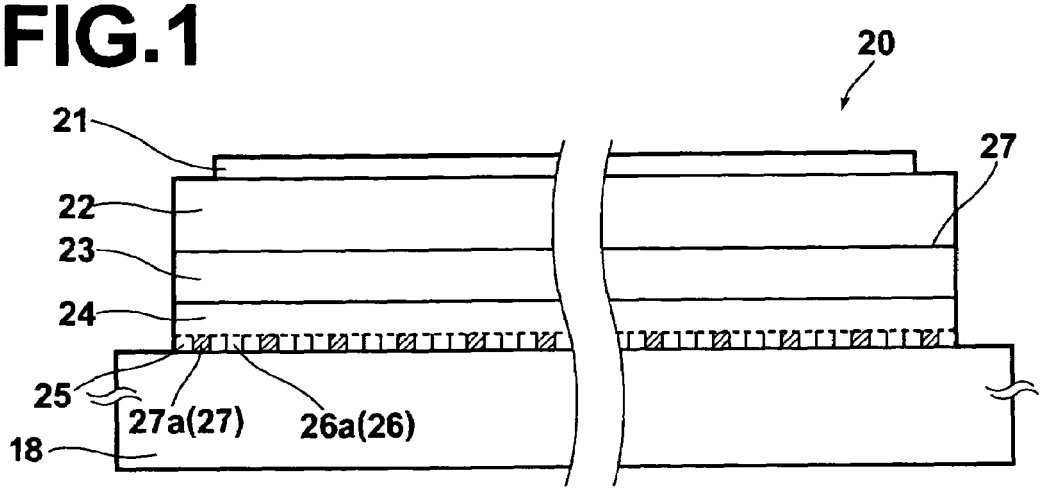
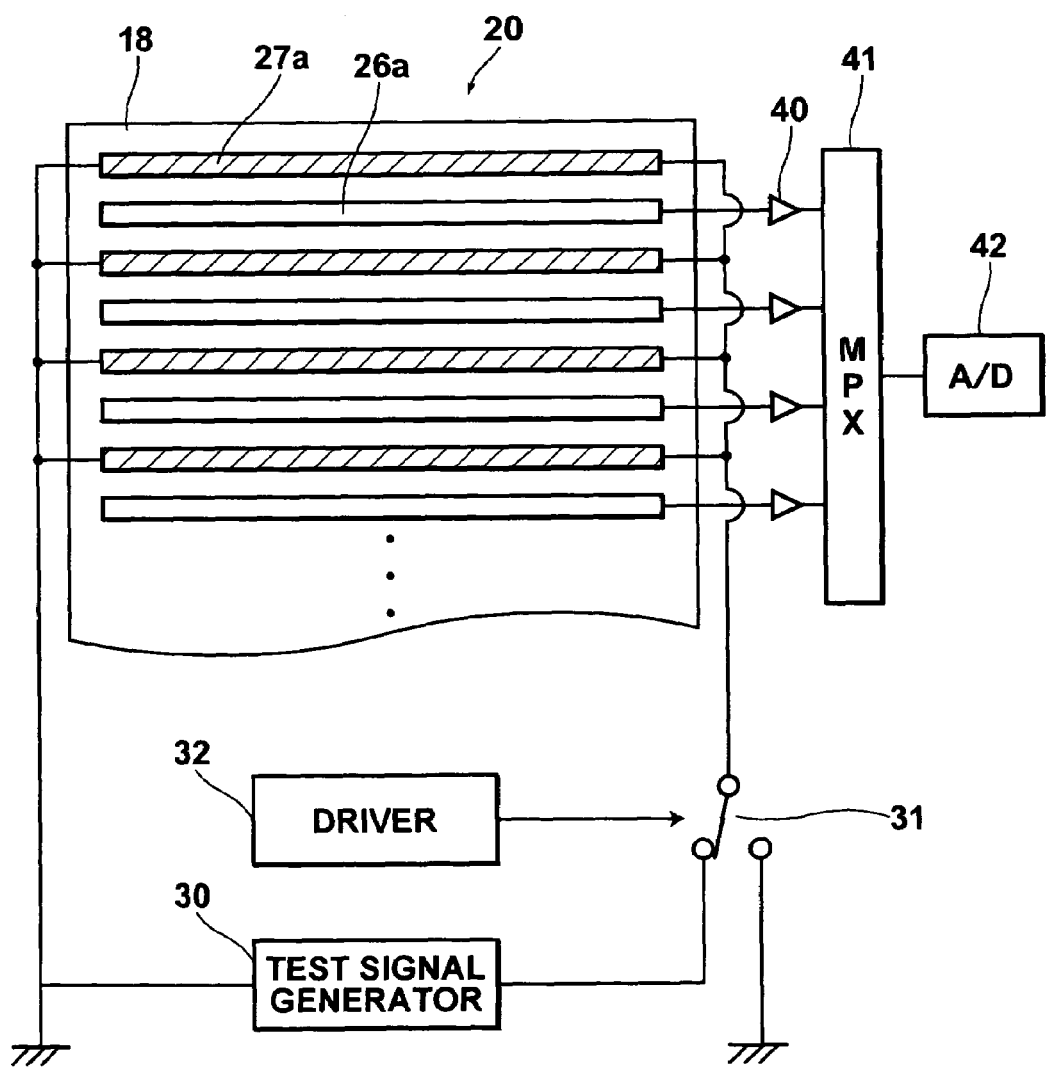

SOLID STATE RADIATION DETECTOR AND METHOD FOR TESTING THE SAME

BACKGROUND OF THE INVENTION

1. Field of the Invention

The present invention relates to a solid state radiation detector having a charge storage section for storing an amount of electric charges as latent image charges that corresponds to the dose of radiation irradiated on the detector or the amount of light excited by the radiation and irradiated on the detector. The present invention is also directed to a method for testing such solid state radiation detector.

2. Description of the Related Art

Today, various types of radiation image recording/readout systems that use a solid state radiation detector (hereinafter also referred to as simply "detector") are proposed in the field of radiation imaging for medical diagnosis and the like. The solid state radiation detector described above temporarily stores electric charges in the charge storage section as latent image charges obtained by detecting radiation, and outputs electrical signals representing the radiation image information by converting the latent image charges. Various types of detectors are proposed as the solid state radiation detector for use in such systems. From the aspect of charge reading out process in which charges stored in the detector are read out, some of the detectors are categorized into the optical readout type in which the charges are read out by irradiating readout light (readout electromagnetic wave) on the detector.

The inventor of the present invention has proposed a detector having a fast readout response along with an efficient signal charge readout capability as one of the optical readout type solid state radiation detector as described in U.S. Pat. Nos. 6,268,614, 6,770,901 and 6,518,575. The detector has a set of layers layered in the order of: a first conductive layer having transparency to recording radiation or light excited by the recording radiation (hereinafter referred to as "recording light"); a recording photoconductive layer that shows conductivity when exposed to the recording light; a charge transport layer that acts as substantially an insulator against charges having the same polarity as the charges charged on the first conductive layer and as substantially a conductor for the charges having the opposite polarity; a readout photoconductive layer that shows conductivity when exposed to readout light; a second conductive layer having transparency to the readout light. The layer composite has a charge storage section formed between the recording photoconductive layer and charge transport layer for storing latent image charges (electrostatic latent image) representing image information.

The solid state radiation detector proposed by the inventor of the present invention in U.S. Pat. Nos. 6,770,901 and 6,518,575, in particular, uses a stripe electrode constituted by multitudes of charge detecting linear electrodes having transparency to readout light as the electrode of the second conductive layer having transparency to readout light. In addition, the detector further includes multitudes of auxiliary electrodes for outputting electrical signals corresponding to the amount of latent image charges stored in the charge storage section. The auxiliary electrodes are opaque to readout light and provided in the second conductive layer such that they are arranged alternately and substantially in parallel with the charge detecting linear electrodes.

By providing the sub-stripe electrode constituted by multitudes of auxiliary linear electrodes in the second conductive layer, a capacitor is newly formed between the charge storage section and sub-stripe electrode. This allows the transport charges having the opposite polarity to that of the latent image charges stored in the charge storage section by the recording light to be charged also on the sub-stripe electrode by the rearrangement of charges in the charge reading out process. This may reduce the amount of transport charges to be allocated to the capacitor formed between the stripe electrode and charge storage section with the readout photoconductive layer being sandwiched between them to relatively small compared with the case where no such sub-stripe electrode is provided. Consequently, the amount of signal charges which may be extracted from the detector to outside is increased and the readout efficiency is improved, resulting in a fast readout response with an efficient signal charge extraction capability.

In the mean time, when checking the stripe electrode (charge detecting linear electrodes) and sub-stripe electrode (auxiliary linear electrodes) for breakage, radiation imaging is performed first by irradiating radiation uniformly on the detector and then image signals are read out from the detector to see if there is any irregularity in the image signals in order to determine any breakage of the electrodes. This method requires a radiation exposure system for performing the test. Further, it requires a relatively long time since imaging and image signal reading out need to be performed for each solid state detector.

The present invention has been developed in view of the circumstances described above, and it is an object of the present invention to provide a solid state radiation detector having charge detecting linear electrodes and auxiliary linear electrodes in which checking of those electrodes for breakage may be performed easily.

SUMMARY OF THE INVENTION

The solid state radiation detector of the present invention is a detector comprising:
  a solid state detecting section constituted by a set of layers layered in the order of:
    a first conductive layer having transparency to recording light,
    a recording photoconductive layer that shows conductivity when exposed to the recording light;
    a charge storage section for storing an amount of electric charges corresponding to the amount of the recording light;
    a readout photoconductive layer that shows conductivity when exposed to readout light; and
    a second conductive layer having multitudes of charge detecting linear electrodes and multitudes of auxiliary linear electrodes, the charge detecting linear electrodes and auxiliary linear electrodes being arranged alternately;
  a test signal generating means for generating a test signal; and
  a connection switching means for connecting at least one end of the auxiliary linear electrodes to either the test signal generating means or ground.

Here, as for the "recording light", any electromagnetic wave, such as light, radiation, or the like, that represents image information may be used, as long as it is capable of recording the image information on a solid state detector as latent image charges (electrostatic latent image) when irradiated on the detector.

As for the "readout light", any electromagnetic wave, such as light, radiation, or the like, may be used, as long as it is capable of generating electrical currents according to the latent image charges (electrostatic latent image) recorded on a solid state detector when irradiated on the detector.

The referent of "charge detecting linear electrodes" as used herein means the electrodes for detecting charge pairs produced in the readout photoconductive layer. Preferably, the charge detecting linear electrodes are transparent to the readout light so that the readout light may incident on the readout photoconductive layer. But they are not necessarily transparent to the readout light if sufficient charge pairs are produced in the readout photoconductive layer by the readout light transmitted through the gaps between the linear electrodes.

The referent of "auxiliary linear electrodes" as used herein means the electrodes for outputting electrical currents in proportion to the amount of latent image charges stored in the charge storage section. Preferably, the auxiliary linear electrodes are opaque to the readout light. But they are not necessarily opaque to the readout light, when shading films or the like which are opaque to the readout light are provided between the auxiliary linear electrodes and a readout light irradiating means. The referent of "being opaque" as used herein means not only those that block the readout light entirely and produce no charge pairs, but also those that have a certain degree of transparency and produce a certain amount of charge pairs that cause substantially no problem. Thus, the charge pairs may be produced in the readout photoconductive layer not only by the readout light transmitted through the charge detecting linear electrodes and the gaps between the linear electrodes, but also by a small amount of the readout light transmitted through the auxiliary linear electrodes.

The referent of "ground" as used herein means a common reference potential (GND) on the circuitry of the solid state radiation detector.

The method for testing the solid state radiation detector of the present invention is a method for testing the solid state radiation detector of the present invention in which the charge detecting linear electrodes and auxiliary linear electrodes of the solid state detecting section of the solid state detector are checked for breakage, the method comprising the steps of:

connecting the test signal generating means to the auxiliary linear electrodes;

inputting the test signal to the auxiliary linear electrodes;

detecting signals outputted based on the test signal from the charge detecting linear electrodes adjacent to the auxiliary linear electrodes to which the test signal has been inputted; and comparing the output signals with a predetermined reference signal to check the charge detecting linear electrodes and auxiliary linear electrodes for breakage.

Generally, the spacing between the charge detecting linear electrode and auxiliary linear electrode is as narrow as several tens of micrometers. When a test signal is inputted to one of the two adjacent linear electrodes with such narrow spacing between them, a crosstalk occurs according to the coupling capacitance, and the crosstalk signal having a similar waveform of the test signal is generated on the other linear electrode. The magnitude of the waveform of the crosstalk signal is proportional to the coupling capacitance between the two linear electrodes. If a breakage occurs in either or both of the charge detecting linear electrode and auxiliary linear electrode, the coupling capacitance is reduced and the magnitude of the waveform of the crosstalk signal becomes smaller by that amount.

Consequently, if a reference signal is provided in advance by measuring the normal magnitude of the waveform of the crosstalk signal, any breakage in the charge detecting linear electrodes or auxiliary linear electrodes may be detected by comparing signals (crosstalk signals) outputted from the charge detecting linear electrodes with the reference signal.

The test may be conducted by inputting the test signal to the auxiliary linear electrodes on an individual electrode basis and detecting a signal outputted from the adjacent charge detecting linear electrode, or by inputting the test signal to a plurality of auxiliary linear electrodes at a time and detecting signals outputted from a plurality of charge detecting linear electrodes at a time.

When recording or reading out a radiation image using the solid state radiation detector of the present invention, the recording method, reading out method and the apparatus that use the conventional solid state detector as described, for example, in U.S. Pat. No. 6,770,901 may be used as they are without modification.

The solid state radiation detector of the present invention includes: a solid state detecting section constituted by a set of layers layered in the order of: a first conductive layer having transparency to recording light, a recording photoconductive layer that shows conductivity when exposed to the recording light, a charge storage section for storing an amount of electric charges corresponding to the amount of the recording light, a readout photoconductive layer that shows conductivity when exposed to readout light, and a second conductive layer having multitudes of charge detecting linear electrodes and multitudes of auxiliary linear electrodes, charge detecting linear electrodes and auxiliary linear electrodes being arranged alternately; a test signal generating means for generating a test signal; and a connection switching means for connecting at least one end of the auxiliary linear electrodes to either the test signal generating means or ground. Consequently, the charge detecting linear electrodes and auxiliary linear electrodes may be checked for breakage through the steps of: connecting the test signal generating means to the auxiliary linear electrodes; inputting the test signal to the auxiliary linear electrodes; detecting the signals outputted based on the test signal from the charge detecting linear electrodes adjacent to the auxiliary linear electrodes to which the test signal has been inputted; and comparing the output signals with a predetermined reference signal. Thus, the checking of the charge detecting linear electrodes and auxiliary linear electrode for breakage may be implemented easily without requiring a radiation exposure system.

BRIEF DESCRIPTION OF THE DRAWINGS

FIG. 1 is a side view of the solid state detecting section of the solid state radiation detector according to an embodiment of the present invention.

FIG. 2 is a schematic configuration diagram of the solid state radiation detector described above.

FIG. 3 is a drawing illustrating crosstalk signals outputted from elements (charge detecting linear electrodes) 26a when a test signal is inputted to elements (auxiliary linear electrodes) 27a.

DESCRIPTION OF THE PREFERRED EMBODIMENTS

Figure 3:
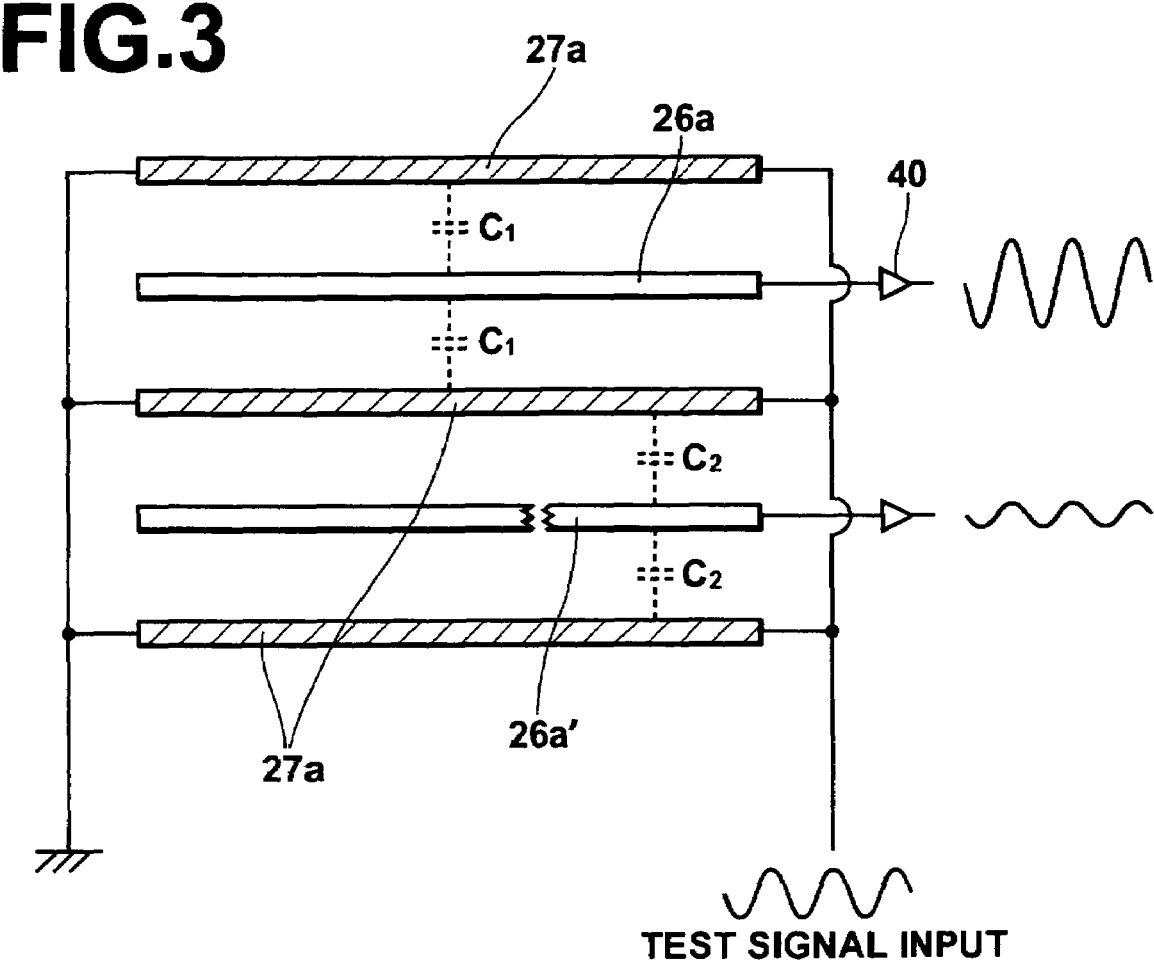

Hereinafter, an embodiment of the present invention will be described with reference to the accompanying drawings. FIG. 1 is side view of the solid state detecting section of the solid state radiation detector according to an embodiment of the present invention. FIG. 2 is a schematic configuration diagram of the solid state radiation detector described above.

The solid state radiation detector includes a solid state detecting section 20 for detecting radiation, a test signal generating means 30 for generating a test signal, and a connection switching means for connecting sub-stripe electrodes 27 of the solid state detecting section 20 to either the test signal generating means 30 or the ground.

The solid state radiation detector 20 includes a set of layers layered in the order of: a first conductive layer 21 shaped like a flat plate and transparent to recording light (radiation or light excited by the radiation) representing radiation image information, such as X-rays transmitted through a subject; a recording photoconductive layer 22 that produces charge pairs and shows conductivity when exposed to recording light transmitted through the first conductive layer 21; a charge transport layer 23 that acts as substantially an insulator against the charges of the charge pairs of latent image polarity (e.g. negative) and as substantially a conductor for the charges of the charge pairs having transport polarity (positive in this case) which is opposite to the latent image polarity; a readout photoconductive layer 24 that produces charge pairs and shows conductivity when exposed to readout light; a second conductive layer 25 having a stripe electrode 26 and a sub-stripe electrode 27; and a base 18 having transparency to the readout light. A charge storage section 29 is formed at the interface between the recording photoconductive layer 22 and charge transport layer 23, which is distributed two-dimensionally and stores charges of latent image polarity that represent image information produced in the recoding photoconductive layer 22.

As for the base 18, a glass substrate having transparency to the readout light or the like may be used. Preferably, a material having a coefficient of thermal expansion which is relatively close to that of the material of the readout photoconductive layer 24 is used as the base material, as well as transparent to the readout light. For example, if a-Se (amorphous selenium) is used as the material of the readout photoconductive layer 24, a material having a coefficient of thermal expansion of preferably in the range from 1.0 to $10.0 \times 10^{-5}$/K at 40 degrees Celsius, more preferably in the range from 4.0 to $8.0 \times 10^{-5}$/K at 40 degrees Celsius is used, taking into account that the coefficient of thermal expansion of Se is $3.68 \times 10^{-5}$/K at 40 degrees Celsius. Materials having a coefficient of thermal expansion that falls within the range described above include organic polymers, such as polycarbonate, polymethyl methacrylate (PMMA), and the like. Use of such materials may result in the matching in thermal expansion between the base 18 as the substrate and the readout photoconductive layer 24 (Se film). This may prevent the problem of breakage due to the difference in thermal expansion between them, including physical separation of the readout photoconductive layer 24 from the based 18, tearing of the readout photoconductive layer 24, or cracking of the base 18 due to thermal stress developed at the interface between them under extraordinary severe environmental conditions in which the detector is exposed to large temperature cycling, such as during transportation by vessel under frigid weather conditions. Further, organic polymer materials are advantageous over a glass substrate in that they are capable of tolerating greater impact shocks.

As for the material of recording photoconductive layer 22, a photoconductive material that consists primarily of at least one of the materials selected from the group of a-Se (amorphous selenium), lead oxide (II), such as PbO, $PbI_2$ and the like or lead iodide (II), $Bi_{12}$ (Ge, Si), $O_{20}$, $Bi_2I_3$/organic polymer nanocomposite, and the like is preferable.

As for the material of the charge transport layer 23, materials having a greater difference in charge mobility between the negative charges charged on the first conductive layer 21 and the opposite positive charges (for example, not less than $10^2$, more preferably, not less than $10^3$), are preferable. These materials include organic compounds such as poly N-vinylcarbazole (PVK), N,N'-diphenyl-N,N'-bis(3-methylphenyl)-[1,1'-biphenyl]-4,4'-dia mine (TPD), discotic liquid crystal, and the like, or semiconductor materials such as TPD-dispersed polymers (polycarbonate, polystyrene, PUK), a-Se doped with 10 to 200 ppm of Cl, and the like. In particular, the organic compounds (PVK, TPD, discotic liquid crystal, and the like) are preferable, since these materials are insensitive to light. Moreover, these materials have generally small dielectric constants, resulting in small capacitance of the capacitor formed between the charge transport layer 23 and readout photoconductive layer 24. Thereby signal extraction efficiency may be improved in the charge reading out process. The referent of "insensitive to light" as used herein means that the material shows practically no conductivity when exposed to recording or readout light.

As for the material of the readout photoconductive layer 24, a photoconductive material that consists mainly of at least one of the materials selected from the group of a-Se, Se—Te, Se—As—Te, nonmetal phthalocyanine, metal phthalocyanine, MgPc (Magnesium phthalocyanie), VoPc (phase II of Vanadyl phthalocyanine), CuPc (Cupper phthalocyanine), and the like is preferable.

Preferably, the thickness of the recording photoconductive layer 22 is in the range from 5 μam to 1000 μm in order to fully absorb the recording light.

Preferably, the total thickness of the charge transport layer 23 and readout photoconductive layer 24 is ½ of the recording photoconductive layer 22. Further, the thinner the total thickness, the faster the response for reading out the signal charges. Thus, the total thickness is preferable to be, for example, 1/10, and more preferably 1/100 of that of the recording photoconductive layer 22. In the present embodiment, the thickness of the readout photoconductive layer 24 is 10 μm.

The materials of the respective layers described above are example materials suitable for the detector in which negative charges are charged on the first conductive layer 21 and positive charges on the second conductive layer 25 to store negative charges as the charges of the latent image polarity in the charge storage section 29 formed at the interface between the recording photoconductive layer 22 and charge transport layer 23, and to allow the charge transport layer 23 to act as what is known as the hole transport layer in which the mobility of positive charges as the charges of transport polarity is greater than that of the negative charges as the charges of the latent image polarity. The charge polarities may be switched between the first and second conductive layers, in which case only minor modifications including modification of the charge transport layer to act as an electron transport layer instead of hole transport layer and the like are required.

For example, a-Se, lead oxide (II), or lead iodide (II) may also be used in this case as the material of the recording photoconductive layer 22, and as for the charge transport layer 23, N-trinitrofluorenylidene-aniline(TNFA) dielectric, trinitrofluorenon(TNF)-dispersed polyester, or asymmetric diphenoquinon derivative is preferable. Further, the nonmetal phthalocyanine, or metal phthalocyanine described above may also be used as the material of the readout photoconductive layer 24.

As for the material of the first conductive layer 21, any material having transparency to the recording light may be used. For example, in order to make it transparent to visible light, a nesa film ($SnO_2$) or ITO (Indium Tin Oxide) known as a transparent thin metal film, or a metal oxide, such as IDIXO (Indemitsu Indium X-metal Oxide; Idemitsu Kosan Co., Ltd.), which is a transparent metal oxide of amorphous state that allows ease of etching, or the like may be used with the thickness in the range from around 50 to around 200 nm, and more preferably, 100 nm or more. Alternatively, a pure metal, such as aluminum (Al), gold (Au), molybdenum (Mo), chromium (Cr) or the like, may be made transparent to visible light by making it as thin as, for example, 20 nm or less (preferably around 10 nm). If an X-ray is used as the recording light to record an image on the detector by irradiating the X-ray from the side of the first conductive layer 21, a pure metal, such as Al, Au or the like, with the thickness of, for example, 100 nm may be used as the material of the first conductive layer 21, since it does not need to be transparent to visible light in this case.

The second conductive layer 25 includes a stripe electrode 26 constituted by multitudes of elements (charge detecting linear electrodes) 26a arranged in stripes, which are transparent to readout light; and a sub-stripe electrode 27 constituted by multitudes of elements (auxiliary linear electrodes) 27a arranged in stripes, which are opaque to the readout light. The elements 26a and 27a are arranged such that they are disposed alternately and in parallel with each other. Further, the stripe electrode 26 is electrically insulated from the sub-stripe electrode 27. The sub-stripe electrode 27 is a conductive member for outputting electrical signals in proportion to the amount of latent image charges stored in the charge storage section 29 formed at the interface between the recording photoconductive layer 22 and charge transport layer 23.

Here, as the electrode material of each of the elements 26a of the stripe electrode 26, ITO (indium Tin Oxide), IDIXO (Indemitsu Indium X-metal Oxide; Idemitsu Kosan Co., Ltd.), aluminum, or molybdenum may be used. As the electrode material of each of the elements 27a of the sub-striped electrode 27, aluminum, molybdenum, chromium, or the like may be used.

In the solid state detecting section 20, a capacitor $C_{*a}$ is formed between the first conductive layer 21 and charge storage section 29 with the recording photoconductive layer 22 being sandwiched between them. Further, a capacitor $C_{*b}$ is formed between the charge storage section 29 and striped electrode 26 (elements 26a) with the charge transport layer 23 and readout photoconductive layer 24 being sandwiched between them, and a capacitor $C_{*c}$ is formed between the charge storage section 29 and sub-striped electrode 27 (elements 27a) with the readout photoconductive layer 24 and charge transport layer 23 being sandwiched between them. The amounts of positive charges $Q_{+a}$, $Q_{+b}$ and $Q_{+c}$ allocated to the respective capacitor $C_{*a}$, $C_{*b}$ and $C_{*c}$ by the rearrangement of charges in the charge reading out process are proportional to the capacitance $C_a$, $C_b$ and $C_c$ of the capacitors with the total amount $Q_+$ is equal to the amount of charges $Q_-$ of the latent image polarity. These relationships may be expressed by the following formulae.

$Q_- = Q_+ = Q_{+a} + Q_{+b} + Q_{+c}$ $Q_{+a} = Q_+ \times C_a/(C_a + C_b + C_c)$ $Q_{+b} = Q_+ \times C_b/(C_a + C_b + C_c)$ $Q_{+c} = Q_+ \times C_c/(C_a + C_b + C_c)$ The amount of signal charges which may be extracted from the solid state detecting section 20 is equal to the sum of the $Q_{+a}$ and $Q_{+c}$ ($Q_{+a} + Q_{+c}$) allocated to the capacitors $C_{*a}$ and $C_{*c}$, and positive charges allocated to the capacitor $C_{*b}$ are not extracted as the signal charges (reference will be directed to U.S. Pat. No. 6,770,901 for further information).

Now, looking at the capacitance of the capacitors $C_{*b}$ and $C_{*c}$ formed by the stripe electrode 26 and sub-stripe electrode 27. The capacitance ratio $C_b:C_c$ corresponds to width ratio $W_b:W_c$ of each element 26a and 27a. In the mean time, addition of the sub-stripe electrode does not have substantially no influence on the capacitance $C_a$ of the capacitor $C_{*a}$ and the capacitance $C_b$ of the capacitor $C_{*b}$.

As a result, the amount of positive charges $Q_{+b}$ allocated to the capacitor $C_{*b}$ by the rearrangement of charges in the charge reading out process may be reduced to relatively small compared with the case where no such sub-stripe electrode 27 is provided. Consequently, the amount of signal charges which may be extracted from the solid state detecting section 20 through the sub-stripe electrode 27 may be increased by the amount corresponding to the reduced amount of the positive charges allocated to the capacitor $C_{*b}$ compared with the case where no such sub-stripe electrode 27 is provided.

One end of the sub-stripe electrode 27 of the solid state detecting section 20 is connected to the input terminal of a switch 31. One of the two output terminals of the switch 31 is connected to the test signal generating means 30 and the other is connected to the ground. The switch 31 is configured to switch the connection of the output side by the control of a driver 32. Thus, the connection switching means is constituted by the switch 31 and driver 32.

Further, the current detecting means 40 are connected to one end of the stripe electrode 26 of the solid state detecting section 20 on an individual element 26a basis. These current detecting means 40 are connected to a multiplexer 41 which is connected to an analog-to-digital (A/D) converter 42.

When a radiation image is recorded on the solid state detector 20 or readout therefrom in the manner as described, for example, in U.S. Pat. No. 6,770,901, the elements 27a (sub-stripe electrode 27) are connected to the ground. When checking the elements 26a and elements 27a for breakage, the elements 27a (sub-stripe electrode 27) are connected to the test signal generating means 30.

Hereinafter, a method for checking breakage of the elements 26a and elements 27a of the solid state detecting section 20 constructed in the manner as described above will be described. FIG. 3 is a drawing illustrating crosstalk signals outputted from elements (charge detecting linear electrodes) 26a when a test signal is inputted to elements (auxiliary linear electrodes) 27a.

Looking at the element 26a that has no breakage in FIG. 3, if the test signal is inputted to two elements 27a adjacent to the element 26a, a crosstalk signal corresponding to two times of the coupling capacitance $C_1$ between the element 26a and element 27a is outputted from the element 26a.

Looking at the element 26a' having a breakage in FIG. 3, if the test signal is inputted to two elements 27a adjacent to the element 26a', a crosstalk signal corresponding to two times of the coupling capacitance $C_2$ between the element 26a' and element 27a is outputted from the element 26a'.

Since the coupling capacitance $C_1$ is greater than the coupling capacitance $C_2$, the magnitude of the waveform of the crosstalk signal outputted from the element 26a' is smaller than that of the crosstalk signal outputted from the element 26a.

Likewise, if one of the elements 27a has a breakage, the magnitude of the waveform of the crosstalk signal outputted from the elements 26a adjacent to the element 27a having the breakage becomes smaller.

Consequently, any breakage in the charge detecting linear electrodes or auxiliary linear electrodes within the solid state detecting section 20 may be detected by measuring the normal magnitude of the waveform of the crosstalk signal in advance to provide a reference signal, sequentially outputting the output signal (crosstalk signal) of each of the elements 26a from the multiplexer 41 to the A/D converter 42 where the signals are digitized, and comparing the digitized signals with the magnitude of the waveform of the reference signal by a CPU (not shown).

So far a preferred embodiment of the present invention has been described, but it will be appreciated that the present invention should not be construed as limited to the embodiment described above. Various changes and modifications are apparent to those skilled in the art without departing from the spirit and scope of the present invention.

The detector according to the embodiment described above includes the recording photoconductive layer that shows conductivity when exposed to recording radiation. The recording photoconductive layer is not necessarily limited to this, and it may be a photoconductive layer that shows conductivity when exposed to light excited by recording radiation (refer to U.S. Pat. No. 6,268,614). In this case, a wavelength conversion layer know as X-ray scintillator that converts the radiation to light with a wavelength in other wavelength regions, such as blue light or the like, is preferably formed on the surface of the first conductive layer. For example, cesium iodide (CsI) or the like is preferably used as the material of the wavelength conversion layer. Further, in this case, a material having transparency to the light excited by the recording radiation and emitted from the wavelength conversion layer is used for the first conductive layer.

Further, the detector according to the embodiment described above includes the charge transport layer between the recording photoconductive layer and readout photoconductive layer, and the charge storage section is formed at the interface between the recording photoconductive layer and charge transport layer. Here, the charge transport layer may be replaced by a trap layer. When the trap layer is used, latent image charges are captured by the trap layer, and stored within the trap layer or the interface between the trap layer and recording photoconductive layer. Further, microplates may be provided on a pixel by pixel basis at the interface between the trap layer and recording photoconductive layer.

What is claimed is:

1. A solid state radiation detector, comprising:
    a solid state detecting section constituted by a set of layers layered in the order of:
        a first conductive layer having transparency to recording light,
        a recording photoconductive layer that shows conductivity when exposed to the recording light;
        a charge storage section for storing an amount of electric charges corresponding to the amount of the recording light;
        a readout photoconductive layer that shows conductivity when exposed to readout light; and
        a second conductive layer having multitudes of charge detecting linear electrodes and multitudes of auxiliary linear electrodes, the charge detecting linear electrodes and auxiliary linear electrodes being arranged alternately;
    a test signal generating means for generating a test signal; and
    a connection switching means for connecting at least one end of the auxiliary linear electrodes to either the test signal generating means or ground.

2. A method for testing the solid state radiation detector of claim 1 in which the charge detecting linear electrodes and auxiliary linear electrodes of the solid state detecting section of the solid state detector are checked for breakage, the method comprising the steps of:
    connecting the test signal generating means to the auxiliary linear electrodes;
    inputting the test signal to the auxiliary linear electrodes;
    detecting signals outputted based on the test signal from the charge detecting linear electrodes adjacent to the auxiliary linear electrodes to which the test signal has been inputted; and
    comparing the output signals with a predetermined reference signal to check the charge detecting linear electrodes and auxiliary linear electrodes for breakage.

* * * * *